United States Patent [19]

Darr et al.

[11] Patent Number: 5,362,018
[45] Date of Patent: Nov. 8, 1994

[54] REVERSIBLE CLIP FOR WIRING HARNESS

[75] Inventors: Christopher J. Darr, Livonia; Yasutaka Suzuki, Northville, both of Mich.

[73] Assignee: Yazaki Corporation, Tokyo, Japan

[21] Appl. No.: 49,010

[22] Filed: Apr. 19, 1993

[51] Int. Cl.⁵ ............................................. F16L 3/08
[52] U.S. Cl. .................... 248/74.3; 24/16 PB; 248/74.1
[58] Field of Search ............... 248/65, 71, 74.1, 74.3, 248/69; 24/16 PB

[56] References Cited

U.S. PATENT DOCUMENTS

| | | | |
|---|---|---|---|
| 3,210,030 | 10/1965 | Ramsey et al. | 248/74.1 |
| 3,632,069 | 1/1972 | Thayer | 248/74.3 X |
| 4,509,710 | 4/1985 | Cooper et al. | 248/74.1 X |
| 4,795,114 | 1/1989 | Usui et al. | 248/74.1 X |
| 4,844,389 | 7/1989 | Nimtz | 248/74.3 X |
| 4,865,280 | 9/1989 | Wollar . | |
| 4,865,281 | 9/1989 | Wollar . | |
| 4,911,388 | 3/1990 | Unger et al. | 248/74.3 |
| 4,942,644 | 7/1990 | Rowley | 24/16 PB |
| 4,953,801 | 9/1990 | Oikawa . | |
| 4,993,669 | 2/1991 | Dyer | 248/74.3 X |

FOREIGN PATENT DOCUMENTS

| | | | |
|---|---|---|---|
| 1296316 | 5/1962 | France | 248/74.3 |
| 1507263 | 12/1967 | France | 248/74.3 |

OTHER PUBLICATIONS

Japanese Utility Model SHO-52-136198.

*Primary Examiner*—Ramon O. Ramirez
*Assistant Examiner*—Derek J. Berger
*Attorney, Agent, or Firm*—Krass & Young

[57] ABSTRACT

A T-shaped molded clip has an elongated base which can be taped at its ends to a harness, and a fastener stem extending from the middle of the base for attachment to a support. The base has a resilient longitudinal web allowing the base to be bent or hinged toward either side to conform to the harness, the amount of bending determined by the harness diameter. The base strips on either side of the web may be flat or concavely contoured on both sides of the clip for mating with the harness. Optionally, the base has two or more webs to enhance the flexibility for conformance to the harness.

10 Claims, 2 Drawing Sheets

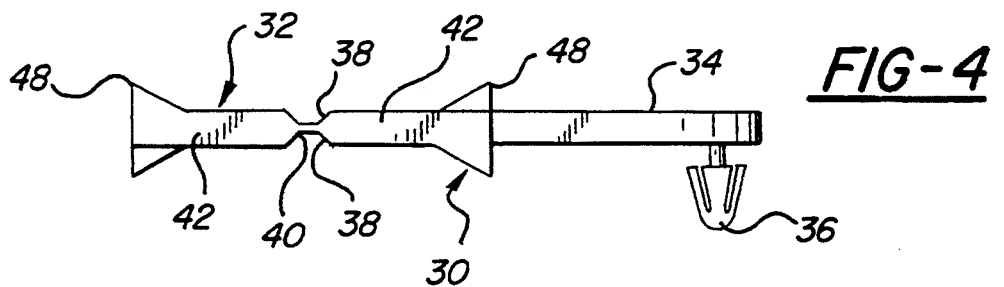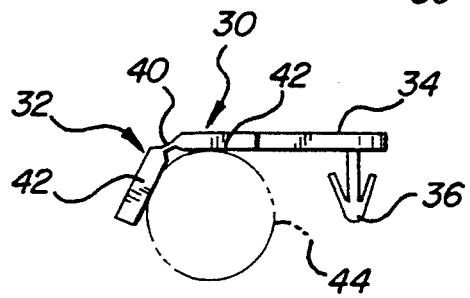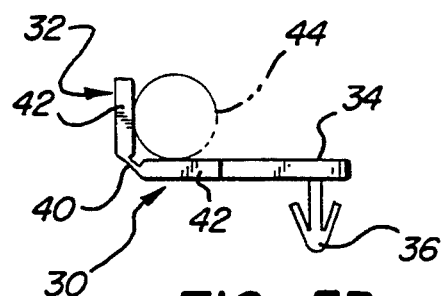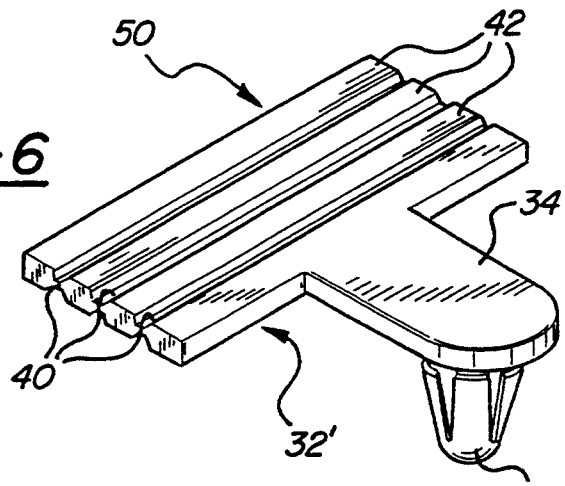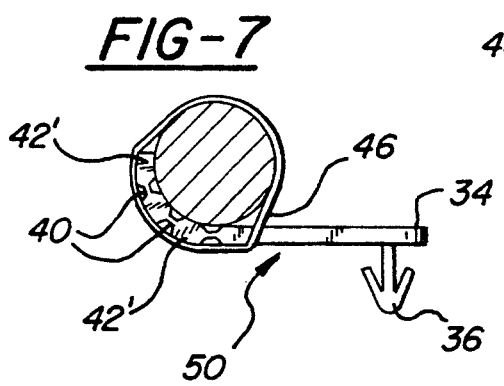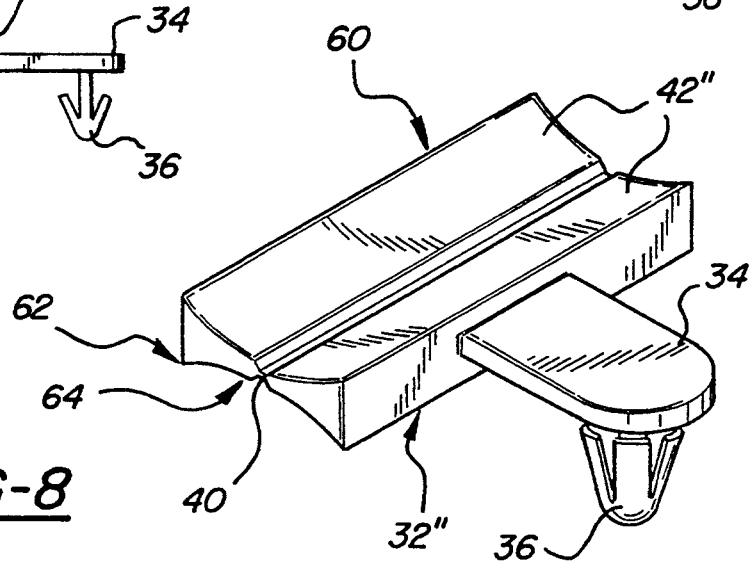

REVERSIBLE CLIP FOR WIRING HARNESS

FIELD OF THE INVENTION

This invention relates to fasteners for securing wiring harness to a support and particularly to a harness clip which can support a wiring harness on either of two sides.

BACKGROUND OF THE INVENTION

In automotive vehicles, for example, electrical conductors are bundled into harnesses which are routed through desired pathways in the vehicle and supported at strategic locations by clips. Typically, as shown in FIGS. 1A and 1B, each clip 10 is T-shaped and has a retainer portion 12 which lies longitudinally along a wiring harness 14 and is secured to the harness 14 by tape 16, and a stem retainer portion 18 which carries at its distal end an attachment anchor 20. The vehicle structure 22 includes an aperture 24 for each clip to receive the attachment anchor 20. The clip 10 is usually molded of a rigid polymer material. In order to seat against or conform to the cylindrical surface of the wiring harness 14, the retainer 12 is molded in a concave shape which approximates the curvature of the harness's circumference the fit of the curved retainer to the harness is problematical, however, since the harness may vary in diameter and in any event is not necessarily quite round in section. Still, some degree of conformance between the clip and harness is attained to foster a secure attachment of the clip.

The clip 10 is useful when the harness 14 and the anchor 20 are on the same side of the clip. Often, the harness routing requires a different attachment where, as shown in FIG. 2, the anchor 20 is on one side of the clip 10' and the harness 14 must be attached to the other side. This requires use of a different clip having the anchor 20 on one side and the concave surface of the retainer 12 on the opposite side. This leads to the expense of making and inventorying two types of clips, and to the problem of having the correct clip in place at the time of assembly to the harness.

SUMMARY OF THE INVENTION

It is therefore an object of the invention to provide a wiring harness attachment clip which can support a wiring harness on either of its two sides. Also, since wiring harnesses vary in diameter, an object is to improve the degree of conformance of the clip to the harness.

The invention is carried out by a reversible clip. By making the retainer portion of the clip resilient in a manner to allow it to bend toward either side, it can upon installation be shaped according to the placement of the wiring harness and the size of the harness diameter. Indeed the act of taping the retainer to the harness will bend or fold the retainer toward the harness, the amount of deformation depending on the harness size. The clip is preferably molded of a polyamide or polypropylene which is resilient in a thin section, although it has adequate stiffness in thicker sections to securely hold the harness to the support.

Resilience in the clip retaining portion is attained by forming a thin longitudinal section as by a pair of opposite grooves along the base to define a resilient web or living hinge. More than one such resilient web may be formed in the base to thus permit even better conformance to the harness. Preferably the retainer is flat or of uniform thickness on either side of the resilient web. One embodiment, however, has a variable thickness retainer, increasing with distance from the web such that both sides are concave prior to installation.

BRIEF DESCRIPTION OF THE DRAWINGS

The above and other advantages of the invention will become more apparent from the following description taken in conjunction with the accompanying drawings wherein like references refer to like parts and wherein:

FIG. 4 is a side view of the clip of FIG. 3;

FIGS. 5A and 5B are side views of the clip of FIG. 3 as applied to different wiring harnesses;

FIG. 6 is an isometric view of another embodiment of a wiring harness clip according to the invention;

FIG. 7 is a side view of the clip of FIG. 6 as applied to a wiring harness; and

FIG. 8 is an isometric view of still another embodiment of a wiring harness clip according to the invention.

DESCRIPTION OF THE INVENTION

Figure 1A:
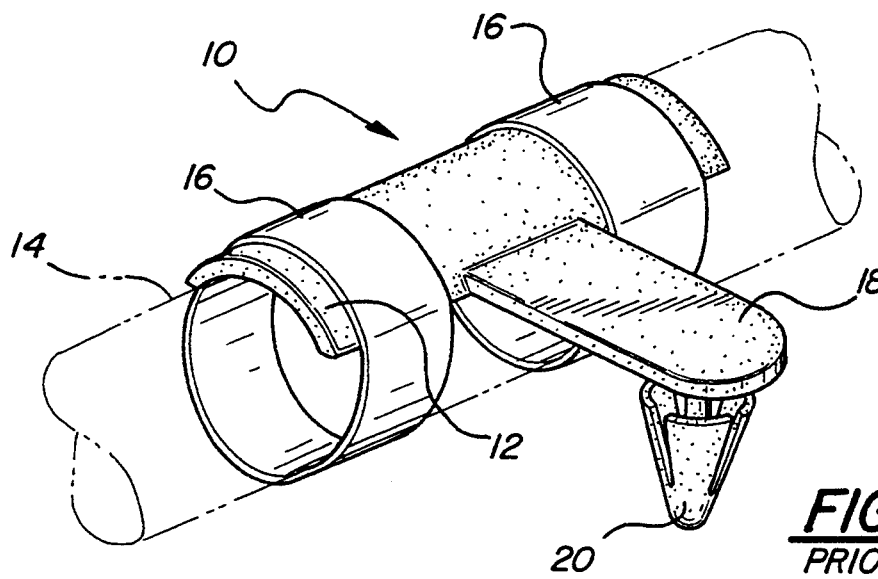
FIGS. 1A and 1B are isometric and side views, respectively of a prior art wiring harness clip installed on a harness.
Figure 1B:
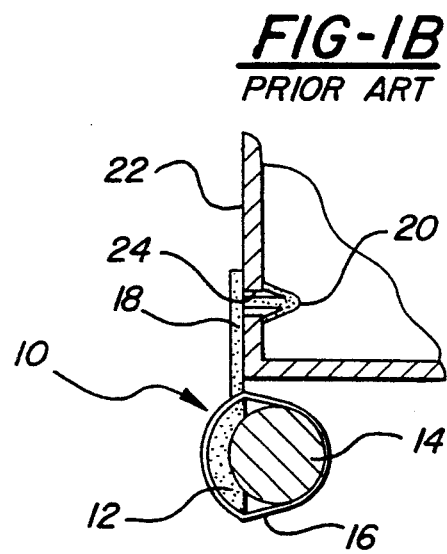
Figure 2:
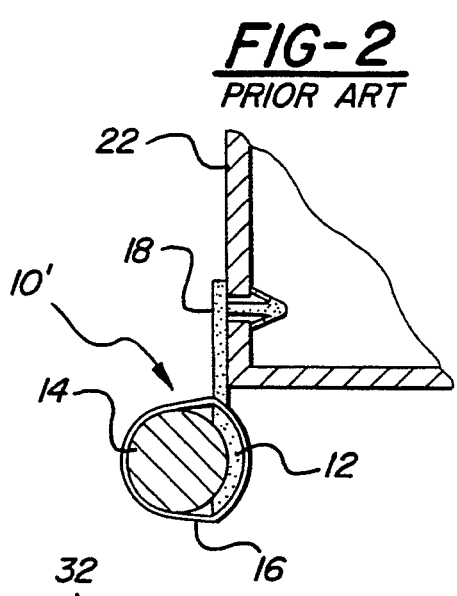
FIG. 2 is a side view of another prior art wiring harness clip installed on a harness.
Figure 3:
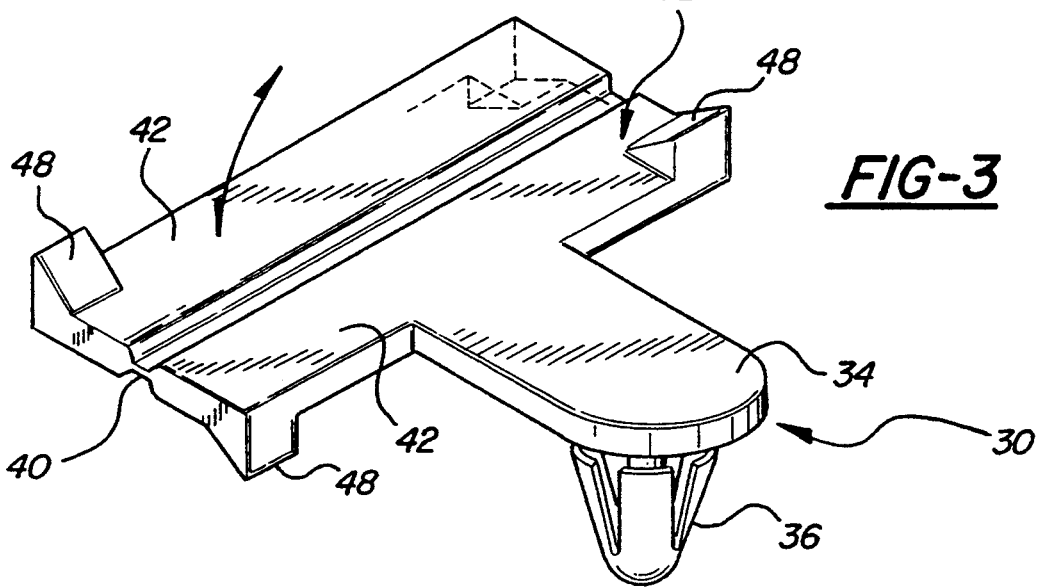
FIG. 3 is an isometric view of a wiring harness clip according to the invention.

Referring to FIGS. 3 and 4, a wiring harness clip 30 is a T-shaped molded polymer device which has two generally flat sides. The clip 30 has a retainer portion 32, a fastener stem 34 extending laterally from the middle of the retainer 32, and an anchor-head hook 36 at the distal end of the stem 34. Other types of hooks 36 are known and may be used if desired. The hook 36 projects from one side of the clip and normal to the stem surface. To allow the retainer 32 to conform somewhat to a wiring harness, a pair of longitudinal opposed grooves 38, one on each side of the clip, are formed along the retainer 32, thereby defining a thin web 40 joining two rectangular base strips 42, each strip having a rectangular cross section. At each end of the clip a ramp-like retaining ear 48 projects laterally from opposite sides of the base strips to prevent the tape from sliding off the clip, as is already achieved in prior clips by different configurations.

The material of the clip is a polymer which affords stiffness and strength of the clip but which is resilient at the red, iced section of web 40 to permit bending of the retainer 32 when it is installed on a wiring harness. Such a material may be polyamide or polypropylene, for example. As shown in FIGS. 5A and 5B, the resilient web 40 comprises a living hinge which bends when the retainer 32 is applied to a wiring harness 44. The degree of bending depends on the diameter of the harness; the base therefore conforms to the harness when taped thereto. Due to the symmetry of the retainer, it bends equally well to either side so that the clip can be bent toward or away from the side carrying the hook for application to either side of the harness. Thus the clip is reversible and takes the place of the two prior art clips. In addition to the advantages of reducing the number of different parts, a better fit is obtained for various sizes of harnesses. The better fit not only helps the clip to seat more securely, it also requires less tape to secure the clip by reducing gaps between the retainer portion and the harness.

FIGS. 6 and 7 depict another embodiment of a wiring harness clip 50 wherein more than one hinge or web 40 is molded into the retainer 32'. In the example shown, three parallel webs 40 extend longitudinally across the retainer to define four base strips 42'. As in the previous embodiment, the retainer 32' can bend in either direction but it has greater flexibility to conform very closely to the wiring harness 44 where it is secured by tape 46.

Another feature is shown in the clip 60 embodiment of FIG. 8 which is like the clip 30 of FIG. 3 except that instead of flat rectangular strips joined by the web 40, the strips 42" which make up the retainer 32" are each contoured to aid in conforming to the harness. Each strip 42" has a thick outer section 62 and arcuately tapers to a thin inner section 64 which is joined to the resilient web 40. Each strip 42" is thus cylindrically concave on each side of the clip to mate with a wiring harness on either side when bent toward the harness and taped in place.

It will thus be apparent that each embodiment of the improved wiring harness clip is advantageous in that it is reversible, thereby eliminating the need for two different parts, and it can fit more snugly against a harness for various harness sizes. In addition the better it reduces gaps and thus saves on the amount of tape needed for attachment to the harness.

The embodiments of the invention in which an exclusive property or privilege is claimed are defined as follows:

1. A clip for securing a wiring harness to a support, the clip having two sides and being subject to either side engaging the harness, comprising:
    an elongated retainer portion for engagement parallel with the longitudinal axis of the wiring harness;
    a fastening stem projecting laterally from the retainer portion and having a distal end for attachment to the support;
    means for conforming the retainer portion to the curvature of the wire harness, the means comprising at least one longitudinal reduced section in the retainer portion defining at least one resilient web which allows bending of the retainer portion.

2. The clip as defined in claim 1 wherein the at least one reduced section is formed by at least one longitudinal groove along the retainer portion.

3. The clip as defined in claim 1 wherein the at least one reduced section is formed by at least one pair of opposed longitudinal grooves along the retainer portion.

4. The clip as defined in claim 1 wherein the retainer portion comprises a, pair of adjacent strips of uniform thickness joined by an integral resilient hinge.

5. The clip as defined in claim 1 wherein the retainer portion comprises a pair of adjacent strips of variable cross section, each having an outer thick section tapering concavely on both sides to an inner thin section, the thin sections being joined by an integral resilient web, whereby the concave shape of the pair of strips and the resilient web serve to conform the clip to a mating harness.

6. A molded polymer clip for securing a wiring harness to a support comprising:
    a T-shaped member comprising an elongated retainer portion for engagement on either side with the wiring harness and a fastening stem projecting from the retainer portion;
    a fastening anchor on one side of the fastening stem for coupling to a support; and
    the retainer including at least one longitudinal living hinge for conforming the retainer portion to the curvature of the wire harness by bending the retainer portion toward either side.

7. The clip as defined in claim 6 wherein the at least one living hinge comprises at least one longitudinal reduced section in the retainer portion defining at least one resilient web which allows bending of the retainer portion.

8. The clip as defined in claim 7 wherein the at least one reduced section is formed by at least one longitudinal groove along the retainer portion.

9. The clip as defined in claim 6 wherein the retainer portion has opposed ends and each end includes tape retaining means comprising at least one lateral ear protruding from each side of the clip.

10. A clip for securing a wiring harness to a support having a preformed aperture therein, the clip having two sides and being adapted to permit attachment of the wiring harness to either of the two sides, comprising:
    a flat, generally rectangular retainer portion having a longitudinal dimension for engagement parallel with the longitudinal axis of the wiring harness and having at least one longitudinally extending section of reduced stiffness defining at least one resilient hinge connecting laterally adjacent sections of greater stiffness, the at least one resilient hinge allowing the retainer portion to bend about an axis parallel with the longitudinal dimension;
    a stem projecting laterally and generally coplanar from the retainer portion and having a distal end; and
    an anchor hook formed at said distal end and extending outwardly from said stem to be plugged into said aperture.

* * * * *